though the invention is illustrated in terms of a three-component system, i.e., an epoxy-functional

United States Patent [19]
Siwiec et al.

[11] 4,092,373
[45] May 30, 1978

[54] POWDER PAINT WITH EPOXY COPOLYMER WITH ANHYDRIDE AND HYDROXY ACIDS

[75] Inventors: Elaine C. Siwiec, Inkster; Henk Van Oene, Detroit; Ares N. Theodore, Farmington, all of Mich.

[73] Assignee: Ford Motor Company, Dearborn, Mich.

[21] Appl. No.: 552,079

[22] Filed: Feb. 24, 1975

Related U.S. Application Data

[63] Continuation-in-part of Ser. No. 394,878, Sep. 6, 1973, abandoned.

[51] Int. Cl.² ............................................. C08L 63/10
[52] U.S. Cl. ........................... 260/830 R; 260/47 EA; 260/836
[58] Field of Search ......... 260/830 R, 78.4 D, 47 EP, 260/47 EC, 47 EA

[56] References Cited
U.S. PATENT DOCUMENTS

| | | | |
|---|---|---|---|
| 2,703,765 | 3/1955 | Osdal | 260/47 EP |
| 3,404,018 | 10/1968 | Hicks | 260/47 EP |
| 3,541,055 | 11/1970 | Malamet | 260/78.4 |
| 3,758,632 | 9/1973 | Labana | 260/836 |
| 3,770,848 | 11/1973 | Labana | 260/836 |
| 3,781,379 | 12/1973 | Theodore | 260/836 |
| 3,781,380 | 12/1973 | Labana | 260/836 |

*Primary Examiner*—Paul R. Michl
*Attorney, Agent, or Firm*—Edmund Ross, Jr.; Keith L. Zerschling

[57] ABSTRACT

Improved powder coating compositions are disclosed which a particulate mixture of (1) an epoxy-functional copolymer of about 5 to about 20 weight percent of a glycidyl ester of a monoethylenically unsaturated acid and about 95 to about 80 weight percent of monoethylenically unsaturated monomers consisting essentially of monofunctional monomers selected from the group consisting of esters of a $C_1 - C_8$ monohydric alcohol and acrylic acid, esters of a $C_1 - C_8$ monohydric alcohol and methacrylic acid and $C_8 - C_{12}$ monovinyl hydrocarbons, and having a glass transition temperature in the range of 40° to about 90° C. and a molecular weight ($\overline{M}_n$) in the range of about 1,500 to about 15,000, (2) an anhydride crosslinking agent selected from the group consisting of (a) monomeric anhydrides of dicarboxylic acids and (b) homopolymers of monomeric anhydrides of dicarboxylic acids, and present in an amount that provides about 0.3 to about 1.2 anhydride groups for each epoxy group on said copolymer, and (3) a hydroxy carboxylic acid having a melting point in the range of about 400° to about 150° C. and present in an amount such as to provide about 0.1 to about 0.4 carboxyl groups per epoxy group in said copolymer.

2 Claims, No Drawings

POWDER PAINT WITH EPOXY COPOLYMER WITH ANHYDRIDE AND HYDROXY ACIDS

This application is a continuation-in-part of application Ser. No. 394,878 filed Sep. 6, 1973 now abandoned.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) a copolymer of a glycidyl acrylate and other olefinically unsaturated monomers, (2) a dicarboxylic acid crosslinking agent, and (3) a polymeric flow control agent were heretofore described in U.S. Pat. No. 3,752,870 to Santokh S. Labana.

Powder coating materials comprising (1) a copolymer of a glycidyl acrylate and other olefinically unsaturated monomers, (2) a crosslinking agent comprising a mixture of a monocarboxylic acid and a dicarboxylic acid, and (3) a polymeric flow control agent were heretofore described in U.S. Pat. No. 3,730,930 issued May 1, 1973 to Santokh S. Labana.

Powder coating materials comprising (1) a copolymer of a glycidyl acrylate and other olefinically unsaturated monomers, (2) an anhydride (monomeric and polymeric) crosslinking agent, and (3) a polymeric flow control agent was heretofore described in U.S. Pat. No. 3,781,379 issued Dec. 25, 1973 to Santokh S. Labana and Ares N. Theodore, a coinventor.

THE INVENTION

It now has been discovered that the addition of hydroxy carboxylic acids to an epoxy-functional copolymer and an anhydride, preferably polyanhydride, powder coating system provides coating powders with excellent flowability and functional group conversion upon curing even at temperatures lower than those conventionally used for curing acrylic based powder coatings. The coatings obtained by baking these powders at 300° F. for 20–30 minutes have excellent gloss, adhesion to metals, hardness and solvent resistance. Further, aside from crosslinking capabilities, the dual functionality of the hydroxy carboxylic acid in combination with the anhydride and the epoxy-functional copolymer provides a powder mix characterized by a polarity factor that facilitates homogeneous mixing and dispersion of pigments thus providing a high degree of system compatibility and makes possible highly uniform coatings.

These powders are effectively prepared by spray drying in that they resist phase separation. They may also be processed by melt blending and vacuum drying techniques. They are easily and effectively mixed by extrusion or mill rolling. Further, the need for an antistatic agent is eliminated when a film depth of less than 4 mils (0.004 in.) is to be applied.

Except in those instances wherein a specific compound is named, the term "acrylate" is used in this specification to include esters of both acrylic acid and methacrylic acid, i.e., acrylates and methacrylates.

DETAILED DESCRIPTION OF THE INVENTION

Epoxy functional copolymers suitable for use in the powder coating materials of this invention are readily formed by conventional free radical induced polymerization of suitable alpha-beta olefinically unsaturated monomers. These copolymers having pendant epoxide groups are potentially self-crosslinking but the epoxy-epoxy reaction is very slow and requires large amounts of catalyst to accelerate the curing reaction. Thus, in this invention, a crosslinking agent, i.e., an anhydride and a hydroxy carboxylic acid, is added to the paint binder system.

The copolymers used in this invention contain between about 5 and about 20, preferably between 8 and 15, weight percent of a glycidyl ester of a monoethylenically unsaturated carboxylic acid, e.g., glycidyl acrylate and glycidyl methacrylate. These monomers provide the copolymer with its epoxy functionality.

The remainder of the copolymer consists essentially of monofunctional, alpha-beta olefinically unsaturated monomers. These can be acrylates or a mixture of acrylates and monovinyl hydrocarbons. Preferably, in excess of 50 weight percent of the copolymer monomers are esters of a $C_1 - C_8$ monohydric alcohol and acrylic or methacrylic acid, i.e., methyl methacrylate, ethyl acrylate, butyl acrylate, butyl methacrylate, hexylacrylate, and 2-ethyl hexyl methacrylate. $C_8 - C_{12}$ monovinyl hydrocarbons such as styrene, alpha methyl styrene, vinyl toluene, t-butyl styrene, chlorostyrene, and alpha methyl styrene are suitable for use but preferably comprise less than 50 weight percent of the copolymer. Other vinyl monomers such as vinyl chloride, acrylonitrile, methacrylonitrile, and vinyl acetate may be used as modifying monomers. When employed these comprise between 0 and 30 percent by weight of the monomer mixture.

The epoxy-functional copolymers used in these coating compositions have a glass transition temperature in the range of 40° to 90° C., preferably between 50° C. and 80° C., and a molecular weight ($\bar{M}_n$) in the range of about 1500 to about 15,000, preferably about 2500 to about 6,000.

In preparing this copolymer, the epoxy-functional monomer, e.g., glycidyl methacrylate is mixed with the afore-mentioned ethylenically unsaturated remainder monomers and reacted by conventional free radical initiated polymerization in such proportions as to obtain the copolymer for the powder coating compositions. Thus, when the preferred ethylenically unsaturated remainder monomers are used with the epoxy-functional monomer to form the copolymer, the epoxy-functional monomer, e.g., glycidyl methacrylate, is present in the copolymer from about 5 weight percent to about 20 weight percent and the preferred remainder monomers are present from about 95 to about 80 weight percent. Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, di-(2-ethylhexyl) peroxydicarbonate, diisopropyl peroxydicarbonate, t-butyl-peroxypivalate, decanoyl peroxide, azobis (2-methylpropionitrile, etc. The polymerization is preferably carried out in solution using a solvent in which the epoxy-functional copolymer is soluble.

Toluene, xylene, dioxane, butanone, etc., are suitable solvents for this polymerization. If the epoxy-functional copolymer is prepared in solution, the solid copolymer can be precipitated by pouring the solution at a slow rate into a non-solvent for such copolymer such as hexane, octane or water under a suitable agitation condition. The copolymer thus obtained is further dried so that it contains less than three percent of the materials that volatilize at the temperatures used for baking the coatings.

These copolymers can also be prepared by emulsion polymerization, suspension polymerization, bulk polymerization or their suitable combinations. In these methods of preparing the copolymers, chain transfer agents may be required to control the molecular weight of the copolymer to a desired range. The solid copolymers obtained by these methods must also be dried to contain less than three percent of the materials that volatilize at the temperatures used for baking the coatings.

For powder coating applications, both molecular weight and molecular weight distribution of the epoxy-functional copolymer is important. While the molecular weight ($\overline{M}_n$) range extends from about 1,500 to about 15,000, the copolymer component must not contain significant amounts of higher molecular weight fractions. No more than 5 percent of the copolymer should be of molecular weight greater than 20,000. The molecular weight distribution as measured by the ratio of weight average to number average molecular weight ($\overline{M}_w/\overline{M}_n$) should be in the range of b 1.6 to 3.0. The preferred range of molecular weight distribution is in the range of 1.7 to 2.2.

These powder coating compositions include as crosslinking agents for the aforedescribed copolymers both hydroxy carboxylic acids and anhydrides, preferably polyanhydrides.

Hydroxy carboxylic acids with melting points in the range of about 40° to about 150° C. are suitable for use as crosslinking agents in these powders. These include such hydroxy carboxylic acids as 12-hydroxy stearic, 10-hydroxy octadecanoic acid, 3-hydroxy octadecanoic acid, 2-hydroxy myristic acid, 2-hydroxy octadecanoic acid, etc.

The anhydride crosslinking agent may be either monomeric or polymeric, preferably polymeric, and is employed in an amount such as to provide about 0.3 to about 1.2 anhydride groups per functional group, i.e., epoxy and hydroxy groups in the copolymer. The hydroxy carboxylic acids are employed in an amount of about 0.1 to about 0.4 hydroxy carboxylic acid groups per functional group.

Where the anhydride is monomeric, the preferred anhydrides are selected from the group consisting of phthalic anhydride, p-chloro phthalic anhydride, tetrabromo phthalic anhydride, cyclohexane-1,2-dicarboxylic anhydride, 4-methylhexane-1,2-dicarboxylic anhydride, cyclopentane-1,2-dicarboxylic anhydride, dicarboxylic anhydride, dodecyl succinic anhydride, succinic anhydride, maleic anhydride, methyl succinic anhydride and azelaic anhydride. In general, the preferred monomeric anhydrides are those which are ring compounds having a melting point in the range of about 35° to 140° C.

Where the anhydride is polymeric, the preferred polyanhydrides are polyadipic anhydride, polyazelaic anhydride, and polysebasic anhydride but others having a polymeric molecular weight up to about 5000 are useful. Those having a polymeric molecular weight in the range of about 1,000 to about 2,500 are preferred.

These powder coating compositions advantageously contain a flow control agent as a part of the powder coating mixture. The flow control agent is a polymer having a molecular weight ($\overline{M}_n$) of at least 1000 and advantageously comprises between 0.05 and 4.0 weight percent of the mixture. The flow control agent has a glass transition temperature at least 20° C. below the glass transition temperature of the mixture's copolymer.

One group of suitable flow control agents are acrylic polymers. Preferred acrylic polymers which may be used for the flow control agent are polylauryl acrylate, polybutyl acrylate, poly (2-ethylhexyl acrylate), polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000 (advantageously 1000 to 20,000) may also be used, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200° C. and the catalyst should produce a gel time for the powder coating composition at the baking temperature to be used which is at least 1 minute but no greater than 20 minutes. This gel time is preferably in the range of 1 to 12 minutes and most preferably between about 2 and about 9 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl] -2-imidazoline phosphate, and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The catalyst used in an individual powder coating composition is generally solid at room temperature and has a melting point of from 50° to 200° C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkylpoly (ethyleneoxy) phosphate or alkylauryl poly (ethyleneoxy) phosphate; polyethyleneimine, poly (2-vinyl pyrrolidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol-1,4-diglycidyl ether, diglycidyl ether of bisphenol A and its polymers and cellulose acetate butyrates.

Having described the various materials which are employed in formulating the powder coating compositions of this invention, a plurality of examples are hereinafter set forth to illustrate various individual powder coating compositions.

Illustrated copolymers vary in molecular weight from about 1500 to about 15,000.

EXAMPLE 1

An epoxy-functional copolymer is prepared from the below listed components in the manner hereinafter described:

| Reactants | Amounts,grms. | Percent By Weight Of Total Reactants |
| --- | --- | --- |
| glycidyl methacrylate | 225.0 | 15 |
| butyl methacrylate | 645.0 | 43 |
| styrene | 75.0 | 5 |
| methyl methacrylate | 555.0 | 37 |

The above mentioned monomers are admixed in the proportions above set forth and 70.0 grams (4.5% based on combined weights of reactants) of 2,2'-azobis-(2-methyl propionitrile), hereinafter called AIBN, are added to the monomer mixture. The solution is added dropwise over a 3 hour period into 1500 ml. toluene at 100° – 108° C. under nitrogen atmosphere. Then 0.4 grams of AIBN dissolved in 10 ml. of acetone are added over ½ hour period and refluxing is continued for 2 additional hours.

The toluene-polymer solution is diluted in 1500 ml. acetone and coagulated in 16 liters of hexane. The white powder is dried in a vacuum oven at 55° C. for 24 hours. This copolymer has molecular weight - $M_w/M_n$ = 6700/3450 and the molecular weight per epoxy group, WPE, is 1068.

The prepolymer in the amount of 47.0 grams is ball-milled with 2.5 grams of 12-hydroxy stearic acid, 6.2 grams of poly (azelaic anhydride), 0.43 grams of poly (2-ethylhexyl acrylate) of $M_n$ = 9,000, 5.5 grams of titanium dioxide and 4.5 grams of Ferrite yellow for 5 – 10 hours. The fine powder mixture is mill-rolled for 15 minutes at 100° C. or extruded with a twin screw extruder. The resulting melt is granulated and pulverized to particles of 10 – 15 micron range.

The resulting powder obtained in this manner exhibits excellent flowability and is sprayed electrostatically on a grounded steel panel by using electrostatic powder spray gun operating at 50 KV charging voltage. After deposition of the powder, the panel is baked at 300° F. for 30 minutes.

The glossy coating obtained on the panel exhibits good adhesion to primed or unprimed steel panels, hardness and flexibility. This coating applied to other substrates such as glass, brass, zinc, aluminum, copper and bronze also demonstrates good adhesion. The coating obtained is not soluble in gasoline, xylene, methyl ethyl ketone and toluene.

EXAMPLE 2

The procedure of Example 1 is repeated. The same copolymer ($M_w/M_n$ = 6700/3450, WPE = 1068) is used in the preparation of a second powder coating composition. Here, 47.0 grams of this copolymer are combined with the following components:

| | | |
| --- | --- | --- |
| poly (azelaic anhydride) | 7.0 | grams |
| 12 - hydroxystearic acid | 1.5 | grams |
| titanium dioxide | 5.5 | grams |
| Ferrite yellow | 4.5 | grams |
| poly (lauryl acrylate) -$M_n$=8,000 | 0.45 | grams |

All components are ball-milled for four hours and mill-rolled for 15 minutes at 105° C. The material is granulated and pulverized to particle size range of 10 – 50 microns. On melting, this powder levels very well and gelled in 8.5 minutes at 300° F.

Cured coatings of this powder on steel panels, i.e., deposited and cured according to the procedure of Example 1, exhibit excellent appearance. They exhibit high impact strength. Their solvent resistance in the solvents heretofore mentioned in Example 1 is very good.

EXAMPLE 3

The copolymer of Example 1 is used in the formulation of another powder coating composition. Forty-seven grams of this copolymer are combined with the following chemicals:

| | | |
| --- | --- | --- |
| poly (azelaic anhydride) | 5.0 | grams |
| 12 - hydroxystearic acid | 5.0 | grams |
| titanium dioxide | 5.5 | grams |
| Ferrite yellow | 4.5 | grams |
| poly (butyl acrylate — $M_n$=9,000) | 0.5 | grams |
| tetrabutyl ammonium chloride | 0.04 | grams |

The mixture is processed as in Example 1 and converted to a powder of correct particle size. Then it is sprayed on grounded steel panels and cured at 300° F. for 20 minutes.

The cured coating is glossy and smooth. The adhesion and reverse impact properties of these coatings are good as are their resistance to the organic solvents mentioned in Example 1.

EXAMPLE 4

An epoxy-functional copolymer is prepared from the following materials:

| Reactants | Grams | Percent By Weight Of Total Reactants |
|---|---|---|
| glycidyl methacrylate | 20.0 | 10.0 |
| butyl methacrylate | 90.0 | 45 |
| methyl methacrylate | 80.0 | 40 |
| styrene | 10.0 | 5 |

To this mixture are added 10 grams of AIBN (5% by weight of reactants). The polymerization and isolation of the polymer is carried out as in Example 1. The molecular weight of this copolymer is determined to be $M_w/M_n = 5900/3350$ and its glass transition temperature (Tg) is 55° C.

Forty seven grams of this copolymer are combined with the following materials:

| poly (azelaic anhydride) | 5.0 | grams |
|---|---|---|
| 10-hydroxyoctadecanoic acid | 5.0 | grams |
| titanium dioxide | 6.0 | grams |
| Ferrite yellow | 5.0 | grams |
| poly (isododecyl methacrylate) | 0.6 | grams |
| tetrabutyl ammonium iodide | 0.07 | grams |

The mixture of all of these components is ball-milled for 5 hours. Then it is combined with acetone-methylene chloride solvent (1:1 by volume) and ball-milled for another 5 hours. After evaporation of the solvent and granulation of the powder to a particle size range of 10 - 50 microns, grounded steel panels are sprayed with this powder and cured at 300° F. for 30 minutes. These coatings demonstrate excellent gloss and surface smoothness.

EXAMPLE 5

An epoxy-functional copolymer is prepared from the following materials:

| Reactants | Grams | Percent By Weight Of Total Reactants |
|---|---|---|
| glycidyl methacrylate | 40.0 | 20.0 |
| butyl methacrylate | 80.0 | 40.0 |
| methyl methacrylate | 70.0 | 35.0 |
| styrene | 10.0 | 5.0 |

Fourteen grams of AIBN are added to the monomer mixture. The polymerization and isolation of the polymer are carried out using the same procedures used in Example 1.

Forty-seven grams of this copolymer are combined with the following materials:

| poly (sebasic anhydride) | 8.0 | grams |
|---|---|---|
| 3-hydroxyoctadecanoic acid | 5.0 | grams |
| titanium dioxide | 6.0 | grams |
| Ferrite yellow | 5.0 | grams |
| poly (2-ethylhexyl acrylate)-$M_n$=8500 | 0.6 | grams |
| trimethyl benzyl ammonium chloride | 0.06 | grams |

All of the foregoing ingredients are mixed together and processed in accordance with the procedure of Example 1 to obtain a powder coating composition. This powder is sprayed on panels and cured at 300° F. for 20 minutes.

The coatings obtained from this powder exhibits good adhesion to steel, glass, aluminum, zinc and bronze. It also demonstrates good scratch resistance and good resistance to the organic solvents mentioned in Example 1.

EXAMPLE 6

The epoxy-functional copolymer of Example 1 ($M_w/M_n = 6700/3450$, WPE = 1068) is used for the preparation of another powder coating wherein 50.0 grams of this copolymer are combined with the following ingredients:

| glutaric anhydride | 5.0 | grams |
|---|---|---|
| 2-hydroxy myristic | 3.0 | grams |
| polyethylene glycol perfluoro octanoate ($M_n$=3400) | 0.7 | grams |
| tetrabutyl ammonium bromide | 0.05 | grams |
| titanium dioxide | 7.0 | grams |
| ultramarine blue | 3.0 | grams |

These ingredients are mixed together and processed in accordance with the procedure of Example 1 to obtain a powder coating composition. This powder coating composition is sprayed on various test panels. The coating obtained after curing the coatings at a temperature of 300° F. for 25 minutes are glossy and exhibit good adhesion to the panels.

EXAMPLE 7

The epoxy-functional copolymer of Example 1 ($M_w/M_n = 6700/3450$, WPE = 1068) is employed for the preparation of this powder coating. Fifty grams of this copolymer are combined with the following materials:

| succinic anhydride | 5.2 | grams |
|---|---|---|
| 2-hydroxyoctadecanoic acid | 3.0 | grams |
| tetraethyl ammonium iodide | 0.07 | grams |
| poly (lauryl acrylate) — ($M_n$= 8000) | 0.6 | grams |
| titanium dioxide | 6.0 | grams |
| Phthalocyanine Blue | 4.5 | grams |

The above ingredients are mixed together and processed in accordance with the procedure of Example 1 to obtain a powder coating composition. This powder coating composition is sprayed on various test panels and cured at 340° F. for 25 minutes. The coatings demonstrate good adhesion and appearance.

EXAMPLE 8

The procedures of Examples 1 - 7 are repeated with the single exception that an equimolar amount of glycidyl acrylate is substituted for the glycidyl methacrylate used as a constituent of the epoxy-functional copolymer.

EXAMPLE 9

The procedure of Example 1 is repeated with the exceptions that (1) 10% by weight styrene is employed and (2) the amount of methyl methacrylate is reduced by 5% by weight used as a constituent of the epoxy-functional copolymer.

EXAMPLE 10

The procedures of Examples 1 - 7 are repeated with the exceptions that (1) the amount of butyl methacrylate in the monomer mixture is changed to 55% by weight and (2) the amount of methyl methacrylate in the monomer mixture is decreased by an amount equivalent to the butyl methacrylate percentage change.

EXAMPLE 11

The procedures of Examples 1 – 7 are repeated with the exceptions that (1) the amount of butyl methacrylate in the monomer mixture is changed to 10% by weight and (2) the amount of methyl methacrylate in the monomer mixture is increased by an amount equivalent to the butyl methacrylate percentage change.

EXAMPLE 12

An epoxy-functional copolymer is produced using the method of Example 1 and the following materials:

| Reactants | Percent By Weight |
|---|---|
| glycidyl methacrylate | 5 |
| styrene | 5 |
| butyl methacrylate | 45 |
| methyl methacrylate | 45 |

With these materials, AIBN in the amount of 0.8% by weight of the reactants is employed.

This copolymer in the amount of 47.0 grams was compounded with the following materials:

| | | |
|---|---|---|
| poly (azelaic anhydride) | 3.1 | grams |
| 12 - hydroxy stearic acid | 3.3 | grams |
| poly (2-ethylhexyl acrylate) | 0.43 | grams |
| titanium dioxide | 5.5 | grams |
| Ferrite yellow | 4.5 | grams |

The mixture is processed to the preparation of a sprayable coating material following the same procedure used in Example 1. This material is sprayed on substrates and cured as in Example 1. The coatings exhibit good appearance and good adhesion.

EXAMPLE 13

An epoxy-functional copolymer is prepared using the method of Example 1 from the following materials:

| Reactants | Percent By Weight |
|---|---|
| glycidyl methacrylate | 14 |
| butyl methacrylate | 40 |
| methyl methacrylate | 46 |

With these materials, there are used 5 grams of AIBN.

This copolymer is compounded into a coating material using the methods and materials of Example 1, sprayed upon a metal substrate as in Example 1, and cured as in Example 1. In this instance, 47 grams of this copolymer are used with 2.5 grams of poly (azelaic anhydride), 2.5 grams of 12 - hydroxystearic and 1.0 gram of stannic chloride.

EXAMPLE 14

An epoxy-functional copolymer having molecular weight of about 15,000 is prepared using the method of Example 1 from the following materials:

| Reactants | Percent By Weight |
|---|---|
| glycidyl methacrylate | 8 |
| butyl methacrylate | 42 |
| methyl methacrylate | 50 |

With these materials, there are used 0.8 grams of AIBN.

This copolymer is compounded into a coating material using the methods and materials of Example 1, sprayed upon a metal substrate as in Example 1 and cured as in Example 1. In this instance, 47 grams of this copolymer are used with 6.0 grams of poly (azelaic anhydride) and 3.0 grams of 12 - hydroxystearic acid.

EXAMPLE 15

The procedure of Example 1 is repeated except for the difference that the copolymer is formed from the following materials:

| Reactants | Percent By Weight |
|---|---|
| glycidyl methacrylate | 15 |
| vinyl chloride | 20 |
| vinyl toluene | 5 |
| ethyl acrylate | 5 |
| butyl acrylate | 25 |
| methyl methacrylate | 30 |

EXAMPLE 16

The procedure of Example 1 is repeated except for the difference that the copolymer is formed from the following materials:

| Reactants | Percent By Weight |
|---|---|
| glycidyl methacrylate | 15 |
| t-butyl styrene | 5 |
| chlorostyrene | 10 |
| acrylonitrile | 5 |
| butyl methacrylate | 35 |
| methyl methacrylate | 30 |

EXAMPLE 17

The procedure of Example 1 is repeated except for the difference that the copolymer is formed from the following materials.

| Reactants | Percent By Weight |
|---|---|
| glycidyl methacrylate | 15 |
| hexyl acrylate | 15 |
| 2-ethylhexyl methacrylate | 10 |
| butyl acrylate | 10 |
| methyl methacrylate | 50 |

EXAMPLE 18

The procedure of Example 1 is repeated except for the difference that the copolymer is formed from the following materials:

| Reactants | Percent By Weight |
|---|---|
| glycidyl methacrylate | 15 |
| alpha methyl styrene | 5 |
| 2-ethylhexyl acrylate | 5 |
| vinyl acetate | 5 |
| methacrylonitrile | 5 |
| butyl methacrylate | 20 |
| methyl methacrylate | 45 |

EXAMPLE 19

The procedure of Example 7 is repeated with the three exceptions that (1) an equimolar amount of itaconic anhydride is substituted for the succinic anhydride, (2) a functionally equivalent amount of poly (dimethyl siloxane) is substituted for the poly (lauryl acrylate) and (3) an equimolar amount of 10-hydroxyoctadecanoic acid is substituted for the 2-hydroxy octadecanoic acid.

EXAMPLE 20

The procedure of Example 7 is repeated with the exceptions that (1) an equimolar amount of phthalic anhydride is substituted for the succinic anhydride and (2) a functionally equivalent amount of 10-hydroxyoctadecanoic acid.

EXAMPLE 21

The procedure of Example 7 is repeated with the exception that an equimolar amount of p-chlorophthalic anhydride is substituted for the succinic anhydride.

EXAMPLE 22

The procedure of Example 7 is repeated with the exception that an equimolar amount of tetrahydrophthalic anhydride is substituted for the succinic anhydride.

EXAMPLE 23

The procedure of Example 1 is repeated with the exception that an equimolar amount of poly (adipic anhydride) is substituted for the poly (azelaic anhydride).

EXAMPLE 24

The process of Example 1 is repeated with the single difference that the flow control agent, poly (2-ethylhexyl acrylate) is employed in an amount equal to 0.05 weight percent of the powder mixture.

EXAMPLE 25

The process of Example 1 is repeated with the single difference that the flow control agent, poly (2-ethylhexyl acrylate) is employed in an amount equal to 1.0 weight percent of the powder mixture.

EXAMPLE 26

The process of Example 1 is repeated with the single difference that the flow control agent, poly (2-ethylhexyl acrylate) is employed in an amount equal to 2.0 weight percent of the powder mixture.

EXAMPLE 27

The process of Example 1 is repeated with the single difference that the flow control agent, poly (2-ethylhexyl acrylate) is employed in an amount equal to 4.0 weight percent of the powder mixture.

Many modifications of this invention will be apparent to those skilled in the art in view of this specification. It is intended that all such modifications which fall within the scope of this invention be included within the appended claims.

We claim:

1. In a thermosettable powder paint which exclusive of pigments, catalysts, antistatic agents, plasticizers, and flow control agents, the same being conventional non-reactive additives to a thermosettable powder paint, consists essentially of a coreactive particulate mixture of
    (1) an epoxy-functional copolymer of about 5 to about 20 weight percent of a glycidyl ester of a monoethylenically unsaturated acid and about 95 to about 80 weight percent of monoethylenically unsaturated monomers consisting essentially of monofunctional monomers selected from the group consisting of esters of a $C_1$ - $C_8$ monohydric alcohol and acrylic acid, esters of a $C_1$ - $C_8$ monohydric alcohol and methacrylic acid and $C_8$ - $C_{12}$ monovinyl hydrocarbons, and having a glass transition temperature in the range of 40° C. to about 90° C. and a molecular weight ($\overline{M}_n$) in the range of about 1,500 to about 15,000, and
    (2) an anhydride crosslinking agent selected from the group consisting of
        (a) monomeric anhydrides of dicarboxylic acids, and
        (b) homopolymers of monomeric anhydrides of dicarboxylic acids, and
    present in an amount that provides about 0.3 to about 1.2 anhydride groups for each epoxy group on said copolymer,
the improvement which comprises having in admixture with said copolymer and said anhydride crosslinking agent a hydroxy carboxylic acid having a melting point in the range of about 40° C. to about 150° C. in an amount such as to provide about 0.1 to about 0.4 carboxyl groups per epoxy group in said copolymer.

2. A powder paint in accordance with claim 1 wherein said monomeric anhydrides have melting points in the range of about 35° to about 140° C. and said homopolymers of monomeric anhydrides have molecular weight ($\overline{M}_n$) in the range of about 1,000 to about 5,000.

* * * * *